Feb. 27, 1973　　　A. FISCHER　　　3,718,067

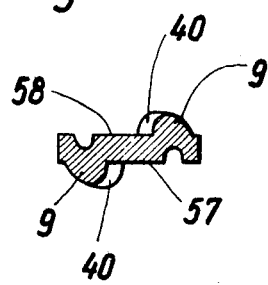
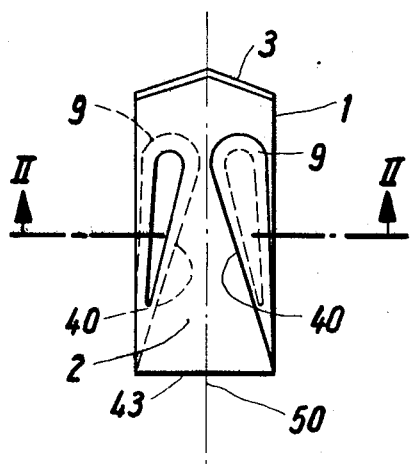
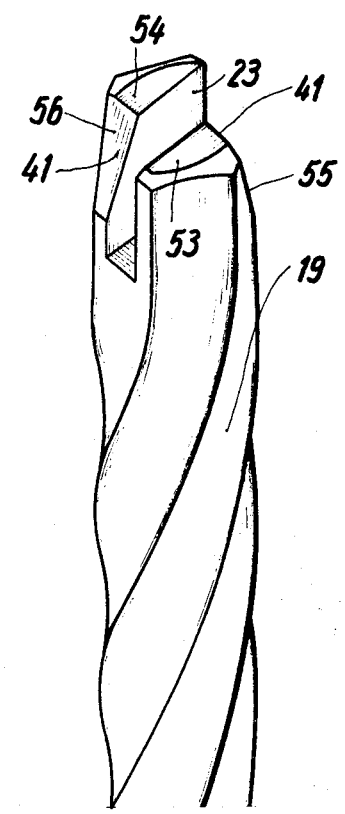
Fig. 2
Fig. 1
Fig. 3

FASTENING SYSTEM

Filed Dec. 15, 1970　　　2 Sheets-Sheet 2

Inventor:
ARTUR FISCHER
By Michael S. Striker
Attorney

United States Patent Office 3,718,067
Patented Feb. 27, 1973

3,718,067
FASTENING SYSTEM
Artur Fischer, 219 Altheimer Str.,
D-7241 Tumlingen, Germany
Filed Dec. 15, 1970, Ser. No. 98,348
Claims priority, application Germany, Dec. 27, 1969,
P 19 65 026.1; Jan. 30, 1970, P 20 04 162.7
Int. Cl. F16b 13/06
U.S. Cl. 85—68                                                      6 Claims

ABSTRACT OF THE DISCLOSURE

A flat first member has two major surfaces and is provided on its leading end portion with cutting edges. for drilling holes in a support structure. A pair of elongated ribs are each provided on one of the major surfaces extending between the trailing and leading end portions of the first member and located at opposite sides of a center line connecting the end portions. The ribs have respective inner edges which face towards the center line and which converge over at least a part of their length at an acute angle towards the leading end portion. An elongated second member has a front portion an axial slot of which can matingly but releasably receive at least the trailing end portion of the first member so that when by engagement of the rear portion of the second member with a tool the two members are jointly rotated, the cutting edges of the first member will drill a hole in the support structure whereupon the second member is released from the first member and withdrawn from the hole. An elongated third member is insertable into the thus-drilled hole and has an expandable portion provided with an axial slit so configurated that when it receives forcibly the trailing end portion of the first member, it is spread apart in locking engagement with the material of the support structure surrounding the hole. The opposite end of the third member is configurated as a threaded fastening portion which projects from the hole and to which an object may be secured.

BACKGROUND OF THE INVENTION

The present invention relates generally to a fastening system, and more particularly to a fastening system for fastening an object to a support structure. Still more specifically the present invention relates to an expansion-anchor type of fastening system.

It is already known to provide such a fastening system in which an element is utilized which is provided with cutting edges by means of which it can drill its own hole into a support structure, and which element is then lodged in the hole and then serves to expand an expansion anchor which can cooperate with it. The expansion anchor is forcibly introduced into the hole so that the trailing portion of the cutting member or cutting element enters into a slot provided on the leading portion of the expansion member and expands the same into engagement with the material of the support structure surrounding the hole which has been formed in the latter.

According to this known construction, which is disclosed in my currently copending application Ser. No. 023,339, filed on Mar. 27, 1970 under the title "Expansion Anchor Unit." the combined cutting and wedging member is in form of an elongated plate-shaped or strip-shaped element the leading end portion of which is provided with the aforementioned cutting edges whereas the trailing end portion of which is provided with wedge surfaces which cooperate with surfaces provided in the aforementioned slot. The major surfaces of this member are provided with two ribs, one on each major surface and located at opposite sides of a center line of the first member. The slot in the member which engages the first member and which is in turn engaged by a tool—such as the chuck of a drill—for rotating the two members together in a sense forming the hole in the support structure, is provided with depressions or recesses in which the ribs are receivable. The ribs extend in parallelism with one another and it will be appreciated that the spacing between the ribs in transverse direction must correspond rather prescisely to the corresponding spacing between the recesses provided for this purpose in the second member which engages the first member. This means that the permissible manufacturing tolerances in the production of these members are quite small.

Further, I have found that the recesses necessary substantially weaken the leading end portion of the second member which engages the first member and which must rotate the same in a sense causing the cutting edges on the first member to drill a hole in the support structure. Under the influence of high torsional forces there thus exists the definite danger that portions of the second member which engage with the ribs on the first member may break. This is particularly true if the first member is used to drill into concrete, where engagement of the cutting edges of the first member with aggregate contained in the concrete or with reinforcement bars or the like, will necessarily result in a sudden increase of the torque acting upon the rotating members so that the danger of breakage of the second member under these circumstances is even more pronounced than ordinarily will be the case.

SUMMARY OF THE INVENTION

It is, accordingly, an object of the present invention to provide an improved fastening system which is not possessed of these disadvantages.

More particularly it is an object of the present invention to provide such an improved fastening system in which the danger of the aforementioned breakage is eliminated or at least substantially reduced.

A concomitant object of the invention is to provide such an improved fastening system in which proper centering and relative positioning of the first member and the second member is obtained, with simultaneous prevention of relative rotation of these members, in a simple manner and without the need for maintaining close manufacturing tolerances.

Still a further object of the invention is to provide such a fastening system which is inexpensive and simple in its construction.

In pursuance of the above objects, and others which will become apparent hereafter, one feature of the invention resides in a fastening system which, briefly stated, comprises a first member having two major surfaces, a trailing end portion and a leading end portion provided with cutting edges for drilling holes in a support structure. A pair of elongated ribs is provided, each of the ribs being located on one of the major surfaces extending intermediate the end portion and being positioned at opposite sides of a center line connecting the end portions. The ribs have respective inner edges which face towards this center line and converge over at least part of their length at an acute angle towards the leading end portion. An elongated second member has a front portion provided with an axial slot adapted to matingly but releasably receive at least the trailing end portion and having abutment faces engageable with the aforementioned inner edges, and a rear portion engageable by a tool which is operative for jointly rotating the members for the purpose of drilling a hole in the support structure preliminary to release of the second member from the first member which remains lodged in the hole. An elongated third member is insertable into the thus-drilled hole and has an expandable portion provided with an axial slit so configurated that it will become expanded in response to forcible entry of at least the trailing end portion of the first member which is lodged in the hole, and further a threaded fastening portion which is adapted to project from the hole for fastening of an object to the support structure.

By having the aforementioned edges at least in part inclined as mentioned, namely at an acute angle towards the leading end portion of the first member, and by having the abutment faces on the elongated second member configurated for complementary mating engagement, excellent centering and retention of the first member in and with reference to the second member is obtained. Due to the aforementioned inclination the positioning of the first member with reference to the second member will always be such that the inner edges abut against their associated abutment faces without requiring the maintenance of close manufacturing tolerances in so far as the transverse distances between the inner edges on the one hand, and between the abutment faces on the other hand, is concerned.

The front portion of the second member is of course bifurcated by the provision of the axial slot. Because of the angular inclination of the abutment faces provided, and which cooperate with the inner edges of the respective ribs, the cross-sectional dimension of the arms created due to this bifurcation remains unimpaired or undiminished in the region of the inner end of the bifurcation, by contrast to the prior construction mentioned above where the abutment faces reduced the cross-sectional dimension of these arms and thus weakened the latter. It is also an advantage of the construction according to the present invention that the angular inclination of the inner edges on the ribs of the first member makes it possible to reliably and readily separate the second member from the first member when the hole has been drilled in the support structure and when the second member—which is connected with the first member only for the purpose of rotating it to drill the hole—is to be withdrawn from the hole while the first member is to remain lodged in the hole. If these edges were to extend in parallelism with one another, as is the case in the aforementioned prior construction, there exists the danger of wedging between them and the associated abutment faces on the second member, making it difficult to disengage the latter from the first member or making such disengagement impossible without withdrawing the first member from the just-drilled hole.

According to another concept of the invention it is particularly advantageous if the second member is constructed in form of a rod of hexagonal cross-section which is twisted about its longitudinal axis, because in this manner the second member can be produced in a most simple and efficient manner, without having to resort to material-removal methods for any purposes other than the formation of the slot and the abutment faces. Additional advantages of so constructing the second member are the fact that it will then have a high degree of resistance to twisting when subjected to torque during drilling, and it will also provide for ready expulsion of powdered material of the support structure which accrues in the hole as the latter is being drilled.

It is also advantageous if the cross-section of the second member is smaller than the width of the first member measured in the general plane of the two major surfaces transversely to the center line of the first member. This prevents seizing of the second member in the hole being drilled.

It will be appreciated that the first member, after having served its one purpose of acting as a drill to drill a hole in the support structure, remains at the bottom of the hole to serve its other purpose, namely upon forcible entry into the slit of the third member to expand the latter and anchor it in the hole. The degree of expansion obtained can be increased according to another concept of the invention by twisting the first member, which is of substantially plate-shaped or strip-shaped configuration in itself about its center line, for instance through 30° or more. The twisting can also be such as to correspond to the inclination of the ribs, in which case the latter will increase further the expansion effect obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a plan view of the combined drilling and wedging member of the fastening system according to the present invention;

FIG. 2 is a section taken on line II—II of FIG. 1;

FIG. 3 is a fragmentary perspectvie view of the second or rotating member which is to be releasably engaged with the member shown in FIG. 1 while the same is used to drill a hole in the support structure;

DESCRIPTION OF THE PREFERRED EMBODIMENTS

Figure 4:
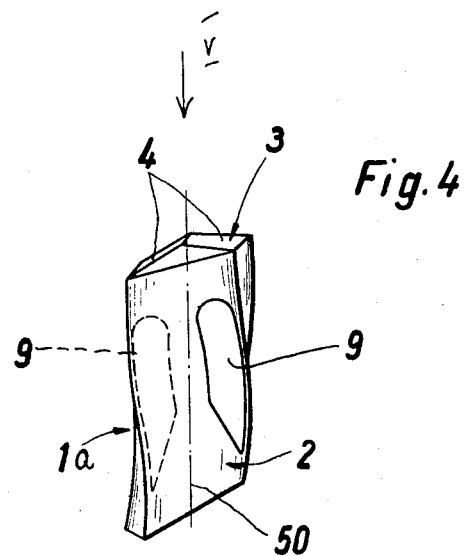
FIG. 4 is a perspective view illustrating the member of FIGS. 1 and 2, but according to a further embodiment of the invention.

Discussing firstly the embodiment in FIGS. 1–3 and 6, it will be seen that the first member of this embodiment is identified with reference numeral 1. It is of generally strip-shaped or plate-shaped configuration as FIG. 1 clearly shows, and is composed of the leading end portion 3 provided with the illustrated cutting edges, and with the trailing end portion 2. The opposite major surfaces of the member 1 are identified with reference numerals 57 and 58 (compare FIG. 2) and at least in the region of the trailing end portion 2 they diverge in wedge-shaped configuration in the direction towards the leading end portion 3. The purpose of this is, of course, that the divergent major surfaces subsequently serve to expand the expanding and holding member shown in FIG. 6, which will be discussed subsequently.

The major surfaces 57 and 58 are each provided at least in the region of the trailing end portion 2 with a pair of elongated ribs 9 extending in longitudinal direction of the member 1 and being located at opposite sides of the longitudinal center line 50 of the same. The inner edges 40 of these ribs 9, that is the edges which face inwardly towards one another and towards the center line 50, converge at an acute angle in the direction towards the leading end portion 3, at least in the region of the rear end 43 of the trailing end portion 2 of the member 1.

The second member of the fastening system is illustrated in FIG. 3 and identified with reference numeral 19. In the illustrated embodiment it is made from a rod of hexagonal cross-sectional configuration which is twisted in itself about its longitudinal axis to assume the configuration illustrated in FIG. 3. Its front portion is provided with an axially recesed slot 23 into which parts of the member 1 are to be received in releasable relationship. The slot 23 bifurcates the front portion of the member 19 as illustrated to form two arms 53 and 54. At diametrally opposite sides the edges of the arms 53 and 54 are recessed as indicated with reference numeral 41, thereby forming abutment faces 55 and 56 which are inclined in the same sense as the inner edges 40 of the ribs 9 and against which these inner edges 40 will abut when the trailing portion 2 of the member 1 is releasably accommodated in the slot 23. Thus, the member 1 is reliably positioned and centered, as well as retained against relative rotation with respect to the member 19, or vice versa. Such forces as act during the drilling operation in axial direction of the connected members 1 and 19, are transmitted via the abutment faces 55 and 56 to the inner edges 40 of ribs 9, making it unnecessary for the rear end 43 of the member 1 to abut against the bottom wall of the slot 23 of the member 19. This, in turn, eliminates the possibility that due to abutment and transmission of substantial forces the rear end 43 might become deformed with resultant wedging of the member 1 in the slot 23 which would make it impossible to withdraw the member 19 from the member 1 and from the bore hole when the drilling operation is completed. Instead, the present invention assures reliable and easy release of the member 19 from the member 1 when the member 19 is to be withdrawn from the bore hole leaving the member 1 behind for subsequent engagement with the third member 60 shown in FIG. 6. This third member in the illustrated embodiment has an expandable portion 61 provided with an axial slot or slit 62 which is so configurated that, when the third member 60 is inserted into the bore hole subsequent to withdrawal of the member 19 therefrom, and is then driven further into the bore hole so that the trailing end portion 2 of the member 1 forcibly enters into the slit 62, th arms bounding the slit 62 are expanded outwardly into tight frictional engagement with the material of the support structure surrounded the bore hole, as is already known from conventional expansion anchors. The rear or fastening portion 63 of the member 60 extends outwardly beyond the bore hole and is provided with a screw thread 64 which permits securing of an object to the member 60 and thereby to the support structure, in known manner.

Figure 5:
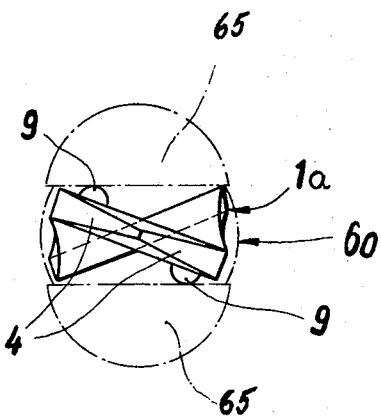
FIG. 5 is an end view of the member shown in FIG. 4, as seen in the direction of the arrow V of the latter figure.
Figure 6:
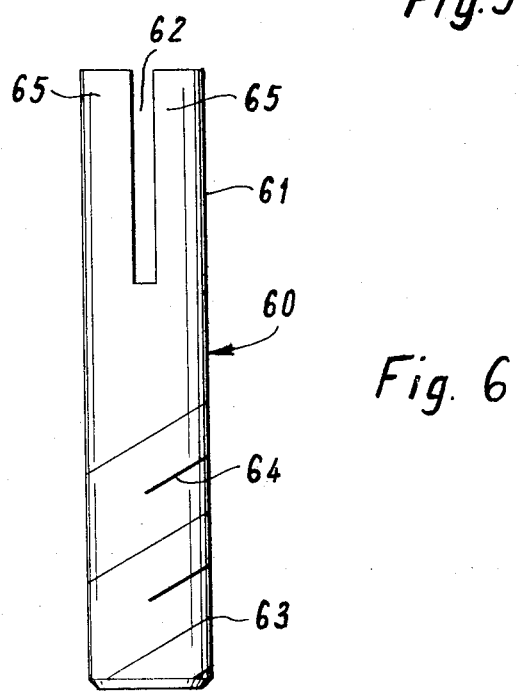
FIG. 6 is a somewhat diagrammatic perspective view illustrating a third or expander and holding member for use with the embodiments of FIGS. 1–3 or 4–5.

In the embodiment illustrated in FIGS. 4 and 5, where again the member 19 of FIG. 3 and the member 60 of FIG. 6 may find use, the first member 1a is configurated analogously to the member 1 in FIGS. 1 and 2. However, in FIGS. 4 and 5 the member 1a is twisted in itself about its center line or longitudinal axis 50. This means that the trailing end portion 2 is turned or twisted with reference to the cutting edges 4a the leading end portion 3 through a predetermined extent, for instance 30° or more. In FIG. 5, which is an end view of the member 1a in FIG. 4 as seen in the direction of the arrow V of FIG. 4, and in which the arms 65 created in the member 60 by the provision of the slit 62 have been shown in phantom lines, it is evident that as a result of such twisting a very strong expansion of the arms 65 of the member 60 will be obtained despite the fact that the member 1 is essentially of plate-shaped or strip-shaped and basically rather flat configuration. Thus, on forcible insertion of the member 60 into the bore hole drilled with the cutting edges 4 of the member 1 or 1a, so that the trailing end portion 2 forcibly enters the slit 62, the arms 65 are spread to a stronger extent when using the embodiment of FIGS. 4 and 5 than when using the embodiment of FIGS. 1 and 2. On the other hand, when drilling with the member 1a of FIGS. 4 and 5 the advantage is obtained that the twisting permits a particularly efficient and easy evacuation of powdered material from the cutting edges 4 rearwardly to the member 19, along which the powdered material then passes outwardly of the bore hole.

It will be understood that each of the elements described above, or two or more together, may also find a useful application in other types of constructions differing from the types described above.

While the invention has been illustrated and described as embodied in a fastening system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A fastening system, comprising a substantially strip-shaped first member having two major surfaces, a trailing end portion and a leading end portion provided with cutting edges for drilling holes in a support structure, and a pair of elongated ribs each provided on one of said major surfaces extending intermediate said end portions and being located at opposite sides of a center line connecting said end portions, said ribs having respective inner edges facing towards said center line and converging over at least part of their length at an acute angle towards said leading end portion; an elongated second member having a front portion provided with an axial slot configurated for matingly but releasably receiving at least said trailing end portion and having inclined abutment faces engageable with the respective inner edges, and a rear portion engageable by a tool operative for jointly rotating said members for drilling a hole in said support structure preliminary to release of said second member from said first member; and an elongated third member insertable into the thus drilled hole and having an expandable portion provided with an axial slot analogous to said axial slot of said second member and also configurated for receiving at least said trailing end portion of the first memebr lodged in said hole, and adapted for expansion in response to entry of said trailing end portion, said third member further having a threaded fastening portion adapted to project from said hole for fastening of an object to said support structure.

2. A fastening system as defining in claim 1, wherein said major surfaces diverge in wedge-shaped configuration towards said leading end portion at least in the region of said trailing end portion.

3. A fastening system as defined in claim 1, wherein said second member is a rod member of hexagonal cross-section, twisted about its longitudinal axis.

4. A fastening system as defined in claim 1, said first member having a predetermined width in direction transversely to said center line and in the general planes of said major surfaces; and wherein said second member is substantially rod-shaped and has a diameter which is smaller than said predetermined width.

5. A fastening system as defined in claim 1, wherein said first member is twisted in itself about said center line through substantially 30°.

6. A fastening system as defined in claim 1 wherein said first member is twisted in itself in at least substantial accordance with the convergence of said inner edges towards said leading end portion.

References Cited

UNITED STATES PATENTS

| | | | |
|---|---|---|---|
| 1,181,071 | 4/1916 | Ferrier | 175—323 |
| 1,449,625 | 3/1923 | Phillips | 85—68 |
| 1,738,382 | 12/1929 | McCullough | 175—394 |
| 1,752,999 | 4/1930 | Phillips | 85—68 |
| 2,902,260 | 9/1959 | Tilden | 175—394 |
| 3,372,763 | 3/1968 | Fischer | 175—394 |
| 3,447,616 | 6/1969 | Granat | 175—394 |

FOREIGN PATENTS

| | | | |
|---|---|---|---|
| 280,834 | 12/1964 | Australia | 85—68 |
| 260,878 | 11/1926 | Great Britain | 175—323 |
| 1,221,056 | 7/1966 | Germany | 85—68 |

MARION PARSONS, JR., Primary Examiner

U.S. Cl. X.R.

175—323, 394